United States Patent
Celi et al.

(10) Patent No.: US 7,519,946 B2
(45) Date of Patent: Apr. 14, 2009

(54) AUTOMATICALLY ADDING CODE TO VOICE ENABLE A GUI COMPONENT

(75) Inventors: Miriam Margarita Celi, Boca Raton, FL (US); Gerald Matthew McCobb, Delray Beach, FL (US); David Jaramillo, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 11/017,314

(22) Filed: Dec. 20, 2004

(65) Prior Publication Data

US 2006/0136868 A1 Jun. 22, 2006

(51) Int. Cl.
*G06F 9/44* (2006.01)
(52) U.S. Cl. ...................... 717/109; 704/270
(58) Field of Classification Search ................ 717/109; 704/270

See application file for complete search history.

(56) References Cited

U.S. PATENT DOCUMENTS

| 7,020,841 | B2 * | 3/2006 | Dantzig et al. ............. 715/727 |
| 7,287,248 | B1 * | 10/2007 | Adeeb ........................ 717/136 |
| 2005/0091057 | A1 * | 4/2005 | Phillips et al. ........... 704/270.1 |

FOREIGN PATENT DOCUMENTS

WO  WO 02/063460  *  8/2002

* cited by examiner

*Primary Examiner*—Wei Y Zhen
*Assistant Examiner*—Phillip H Nguyen
(74) *Attorney, Agent, or Firm*—Cuenot & Forsythe, L.L.C.

(57) ABSTRACT

A method to facilitate programming of multimodal access. The method can include receiving a user input request to voice-enable at least one graphical user interface (GUI) component defined in visual markup code, receiving a user input selecting at least one voice component, and a user input specifying a selected grammar syntax. Responsive to the user inputs, voice markup code corresponding to the selected voice component can be automatically generated and the voice markup code can be automatically linked to the GUI component.

3 Claims, 6 Drawing Sheets

AUTOMATICALLY ADDING CODE TO VOICE ENABLE A GUI COMPONENT

BACKGROUND

1. Field of the Invention

The present invention relates to a user interface for software development and, more particularly, to code editors.

2. Description of the Related Art

The processing power of modern electronic devices continues to increase while such devices are becoming ever smaller. For instance, handheld devices that easily fit into one's pocket, such as cell phones and personal digital assistants (PDAs), now handle a wide variety of computing and communication tasks. The small size of these devices exacerbates the already cumbersome task of entering data, which is typically performed using a stylus or numeric keypad. In response, new devices are now being developed to implement multimodal access, which makes user interactions with electronic devices much more convenient.

Multimodal access is the ability to combine multiple input/output modes in the same user session. Typical multimodal access input methods include the use of speech recognition, a keypad/keyboard, a touch screen, and/or a stylus. For example, in a Web browser on a PDA, one can select items by tapping a touchscreen or by providing spoken input. Similarly, one can use voice or a stylus to enter information into a field. With multimodal technology, information presented on the device can be both displayed and spoken.

While multimodal access adds value to small mobile devices, mobility and wireless connectivity are also moving computing itself into new physical environments. In the past, checking one's e-mail or accessing the Internet meant sitting down at a desktop or laptop computer and dialing into an Internet service provider using a modem. Now, such tasks can be performed wirelessly from a myriad of locations which previously lacked Internet accessibility. For example, one now can access the Internet from a bleacher in a football stadium, while walking through a mall, or while driving down the interstate. Bringing electronic devices into such environments requires new ways to access them and the ability to switch between different modes of access.

To facilitate implementation of multimodal access, multimodal markup languages which incorporate both visual markup and voice markup have been developed for creating multimodal applications which offer both visual and voice interfaces. One multimodal markup language set forth in part by International Business Machines (IBM) is called XHTML+Voice, or simply X+V. X+V is an XML based markup language that extends extensible hypertext markup language (XHTML), a visual markup, with a subset of voice extensible markup language (VoiceXML), a voice markup, and XML Events. There is also some additional X+V specific markup for synchronization of data between XHTML and the Voice XML subset. XML Events is a markup for activation of voice markup in response to document object model (DOM) Level 2 events. XML Events allows authors to attach DOM level 2 event handlers to XML nodes. XML Events markup is typically hand-coded in a text editor or an XML document view of an integrated development environment (IDE).

Another multimodal markup language is the Speech Application Language Tags (SALT) language as set forth by the SALT forum. Existing visual markup languages, such as HTML, XHTML, and (scalable vector graphics) SVG can be extended with SALT to implement multimodal interaction. SALT comprises a small set of XML elements that have associated attributes and DOM properties, events and methods. As for X+V markup, the XML elements are typically hand-coded in a text editor or an XML document view of an IDE.

Current text editors and IDEs lack the necessary functionality for a novice multimodal developer to proficiently create multimodal applications. Users generally need to become familiar with multimodal syntax by consulting the relevant multimodal language specification, or by searching through help documentation, reference books, Web sites, etc. While there is benefit in learning to use the syntax of the multimodal language that one intends to use to create multimodal applications, the learning process can be very time consuming. Thus, it would be beneficial to provide multimodal markup programmers with an interface that simplifies coding of multimodal markup.

SUMMARY OF THE INVENTION

The present invention provides a solution which facilitates programming of multimodal access. In accordance with an embodiment of the present invention, a computer-implemented method can include receiving a user input request to voice-enable at least one graphical user interface (GUI) component defined in visual markup code, receiving a user input selecting at least one voice component specifying a voice markup field name, and receiving a user input selecting a grammar syntax from a plurality of grammar syntaxes. Responsive to the user inputs, voice markup code corresponding to the selected voice component can be automatically generated. The voice markup code can include a field tag formatted according to the voice markup field name, a sync tag, and a grammar tag correlated to the selected grammar syntax. The voice markup code can be automatically formatted according to the selected grammar syntax. The voice markup code can be automatically linked to the GUI component by automatically generating event handler code that links the GUI component with the voice markup code.

Another embodiment of the present invention can include a markup editor that includes a computer system executing a multimodal code generating module that receives a user input request to voice-enable at least one GUI component defined in visual markup code, a user input selecting at least one voice component specifying a voice markup field name, and a user input selecting a grammar syntax from a plurality of grammar syntaxes. Responsive to the user inputs, the computer system can automatically generate voice markup code associated with the voice component. The voice markup code can include a field tag formatted according to the voice markup language field name, a sync tag, and a grammar tag correlated to the selected grammar syntax, where the computer system automatically formats the voice markup code according to the selected grammar syntax. The voice markup code can be automatically linked to the GUI component by automatically generating event handler code that links the GUI component with the voice markup code.

Another embodiment of the present invention can include a machine readable storage being programmed to cause a machine to perform the various steps described herein.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The inventive arrangements disclosed herein provide a solution which simplifies coding of multimodal markup languages. In accordance with the present invention, an architecture is provided that automatically generates voice markup code correlating to voice components, and links the voice markup code to graphical user interface (GUI) components defined in visual markup code. The links can correlate to specific events or conditions associated with the GUI components. Advantageously, this architecture eliminates the need for a multimodal developer to manually write voice markup code when voice enabling GUI components, thus saving the multimodal developer time that otherwise would be spent learning to write the voice markup code.

As used herein, a voice component represents one or more snippets of voice markup that can be integrated with visual markup. For instance, the voice component can be markup code in which the snippets are defined. A GUI component can be markup code where a GUI element is defined, or any other visual representation of a GUI element. Examples of GUI elements are fields, checkboxes and text strings defined in visual markup code. However, there are a myriad of other types of GUI elements known to the skilled artisan and the present invention is not limited in this regard.

Figure 1:
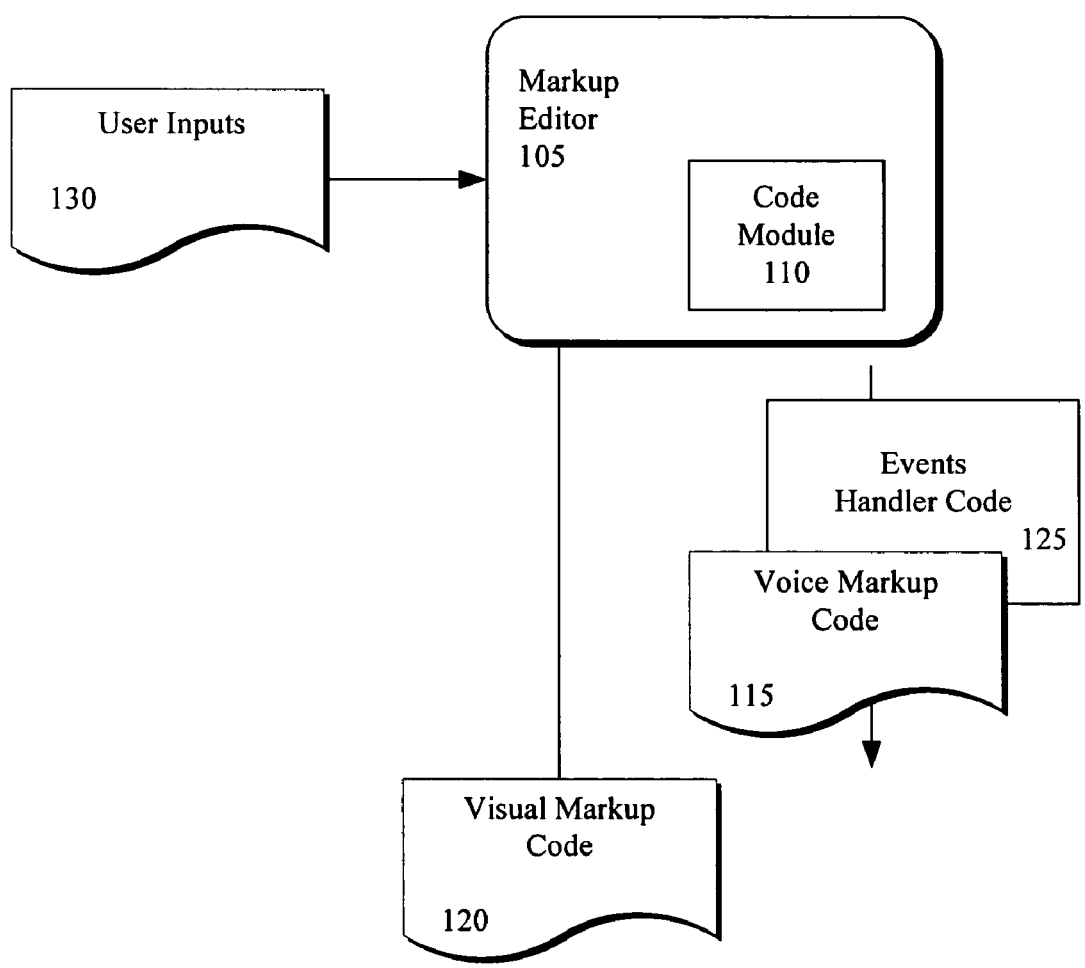
FIG. 1 is a schematic diagram illustrating a system that facilitates programming of multimodal access in accordance with one embodiment of the present invention.

FIG. 1 is a schematic diagram illustrating a system 100 that facilitates programming of multimodal access in accordance with one embodiment of the present invention. The system can include a markup editor 105 that comprises a multimodal code generating module 110 (hereinafter "code module"). The markup editor 105 can be any text editor that is suitable for editing code, and can be implemented as a stand-alone program or as a component of an integrated development environment (IDE). For example, the markup editor 105 editor can be a text editor with knowledge of XHTML syntax for programming in XHTML. Nonetheless, the invention is not limited to XHTML and any other suitable text editor can be used.

The code module 110 can automatically generate voice markup code 115 in accordance with a user selected grammar syntax. The code module 110 also can associate the voice markup code 115 with one or more GUI components defined in visual markup code 120. For instance, the code module can automatically generate event handler code 125 to link the voice markup code 115 to the GUI components. Together the voice markup code 115, the visual markup code 120, and the event handler code 125 can define the multimodal markup code. The multimodal markup code can be contained in a single file (or document), or contained in multiple files. For example, the user can select to include the voice markup code 115 in the same file as the visual markup code 120, or in a separate file.

By way of example, the voice markup code 115 can contain voice components of XHTML+Voice (X+V) markup and the visual markup code 120 can contain visual components of the X+V markup. In such an arrangement, the event handler code 125 can be can be inserted into an XHTML tag in the visual markup code 120 to identify a snippet of VoiceXML that is to be linked to the XHTML tag. The invention is not limited in this regard, however, and the event handler code 125 can be implemented in any other suitable manner. Moreover, the invention is not limited to any particular multimodal access language, but instead can be used to automatically generate multimodal markup code using any suitable language. For example, the methods and systems described herein can be used to generate multimodal markup code using the Speech Application Language Tags (SALT) language.

In one arrangement the code module 110 can comprise a code generation processor and a style sheet generator. Style sheets comprise a plurality of templates, each of which defines a fragment of output as a function of one or more input parameters. The code generation processor can enter markup language parameters into a style sheet to generate resultant files/documents as output. The markup language parameters can be generated from user inputs 130, for instance user inputs that are entered into a wizard or menu.

One example of a code generation processor that can be used is an XSLT processor. In one embodiment in which an XSLT processor is used, the GUI components and voice components can be presented visually in a view presented in the IDE. The user can attach names, grammars, prompts and other information to the voice components, and similarly configure the GUI components. Within the view, the user also can create links between the GUI components and voice components. At any time the user can compile the graphical representation of the multimodal application to a target multimodal language. The first compilation step can generate an intermediary XML language that contains all voice and GUI component configurations, as well as the links between the voice and GUI components. As a final step, the XSLT processor can transform the intermediary XML language to the target multimodal language, for example X+V or SALT.

Figure 2:
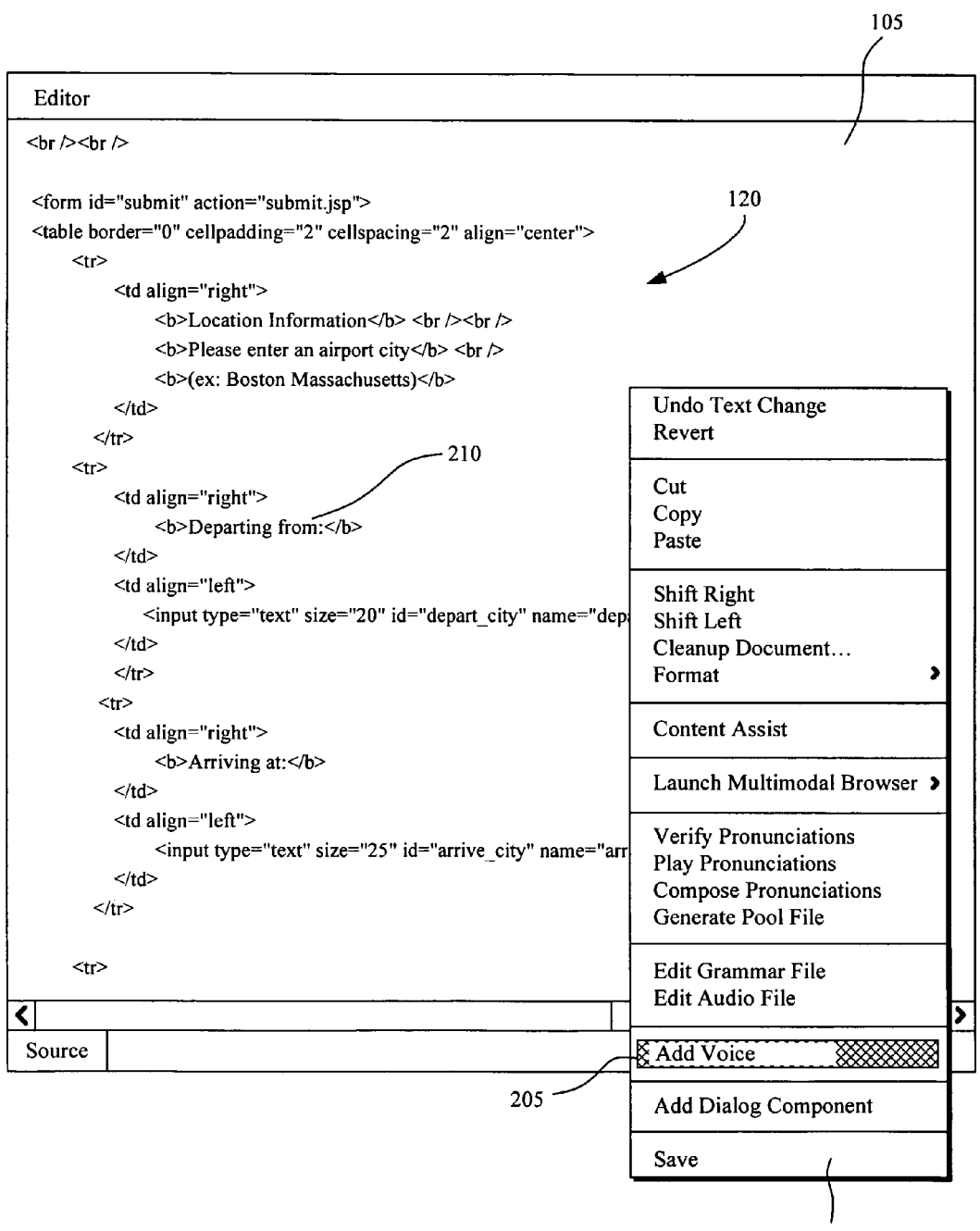
FIG. 2 is a pictorial view of a markup editor for programming multimodal access in accordance with an embodiment of the present invention.

FIG. 2 is a pictorial view of the markup editor 105 for editing the visual markup code 120 in accordance with an embodiment of the present invention. From the markup editor 105, a user can activate a context menu 200 in which the user is presented a selectable option 205 to add voice to (i.e. voice enable) a GUI component 210. The context menu 200 can be activated by clicking a particular mouse button, by selecting an icon, by activating a pull down menu, or in any other suitable manner.

Figure 3:
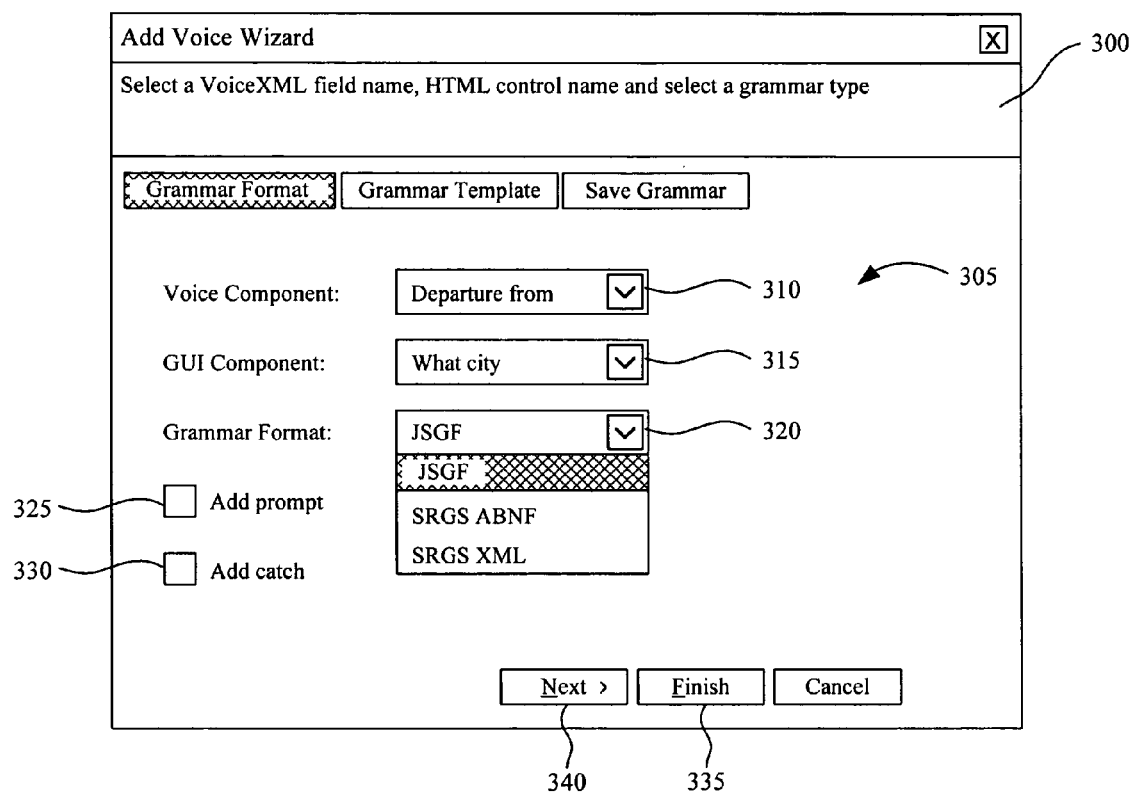
FIG. 3 is a pictorial view of a graphical user interface for receiving user inputs in accordance with an embodiment of the present invention.

Upon receiving a user selection of the option 205, a menu 300 can be presented, as shown in FIG. 3, to receive user inputs for generating the input parameters used by the code module 110 to generate the voice markup code 115 that is to be associated with a particular GUI component 210. The menu 300 can be, for instance, a component of a wizard and can comprise one or more selectable GUI fields 305 for receiving the user inputs. For example, a "Voice component" field 310 can be provided in the menu 300 from which the user can select a voice component that is to be linked to a particular GUI component. A "GUI component" field 315 can be provided to select the GUI component that is to be voice enabled with the selected voice component. A "Grammar format" field 320 can be provided to select grammar syntax to be used for generating the multimodal markup code. Examples of grammar syntax that can be used are defined by the JSpeech Grammar Format (JSGF), the Augmented BNF-based Speech Recognition Grammar Specification (SRGS ABNF) and the XML-based Speech Recognition Grammar Specification (SRGS XML). The skilled artisan will appreciate that other types of grammar syntax can be used and that the invention is not limited to the examples presented herein.

Additional fields also can be provided in the menu 300 to present user selectable attributes for the selected GUI component. For example, an "Add prompt" checkbox 325 and an "Add catch" checkbox 330 can be provided in the menu 300. The "Add prompt" checkbox 325 can be selected if it is desired to associate a prompt with the GUI component selected in the "GUI component" field 315 to prompt a person using the GUI being programmed to enter some form of input. Similarly, the "Add catch" checkbox 330 can be selected if it is desired to associate a catch with the selected "GUI component" field 315 to receive a spoken utterance from a person using the GUI being programmed. The user can be prompted to enter any text required for the prompt or catch.

In an alternative arrangement, individual views can be provided for the additional fields. For instance, a view can be provided for "Add prompt" to enable a user to set different attributes for a prompt element. Similarly, a view can be provided for "Add catch" to enable a user to set different attributes for a catch element. It will be appreciated by the skilled artisan that these are merely examples of views that can be presented and the invention is not limited in this regard. Specifically, more or fewer views can be presented, the views can be presented in other formats, and other types of information can be solicited from the user.

At this point the user can select a "finish" icon 335 and the code module can automatically generate voice markup code. The voice markup code can be formatted in accordance with the selected grammar syntax and can include any text required for the prompts or catches that may be used. Further, the voice markup code can be optimized for the file or document containing the visual markup code defining the GUI component with which the voice markup code is associated. For instance, the code module can evaluate the file to determine whether certain required lines of code are already present in the file (e.g. <vxml:field>, <vxml:sync>, etc.). If not, these lines of code can be generated as part of the voice markup code. Further, a grammar tag correlating to the grammar syntax used to generate the voice markup code can be automatically inserted into the voice markup code. The grammar tag can be used by voice processors to identify the grammar syntax used to format the voice markup code.

Figure 4:
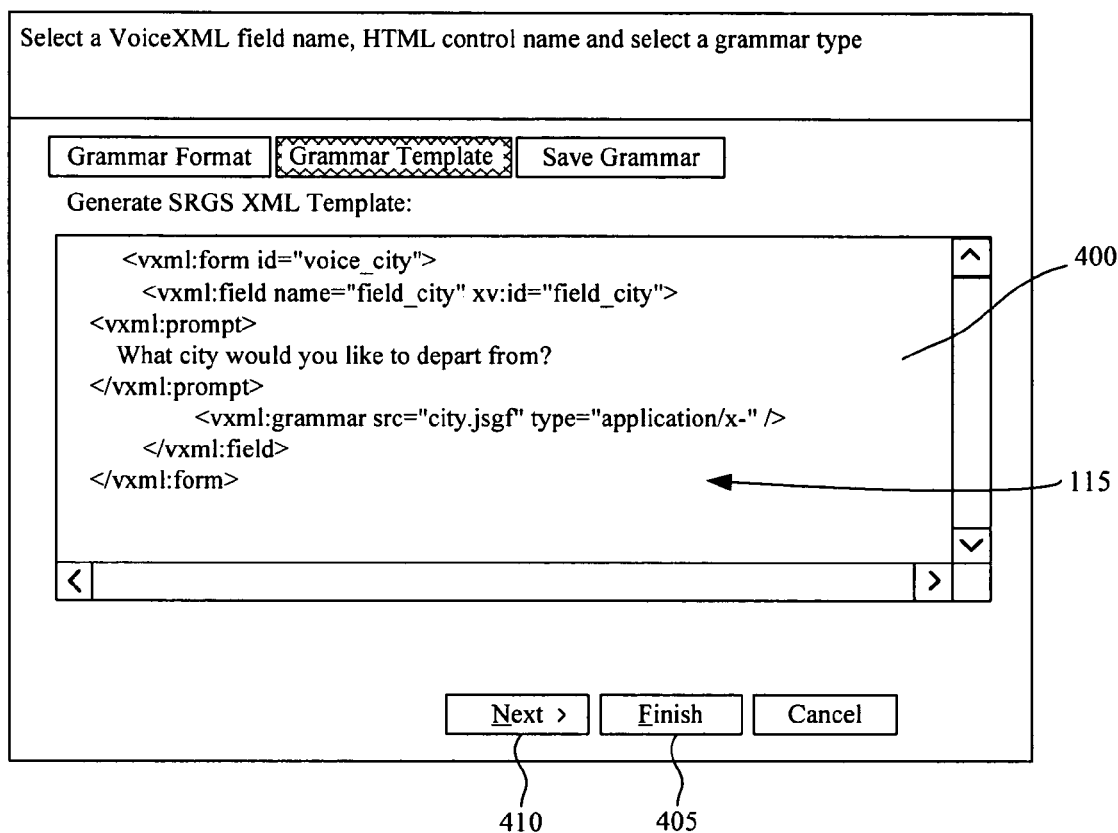
FIG. 4 is a pictorial view of another graphical user interface for receiving user inputs in accordance with an embodiment of the present invention.
Figure 5:
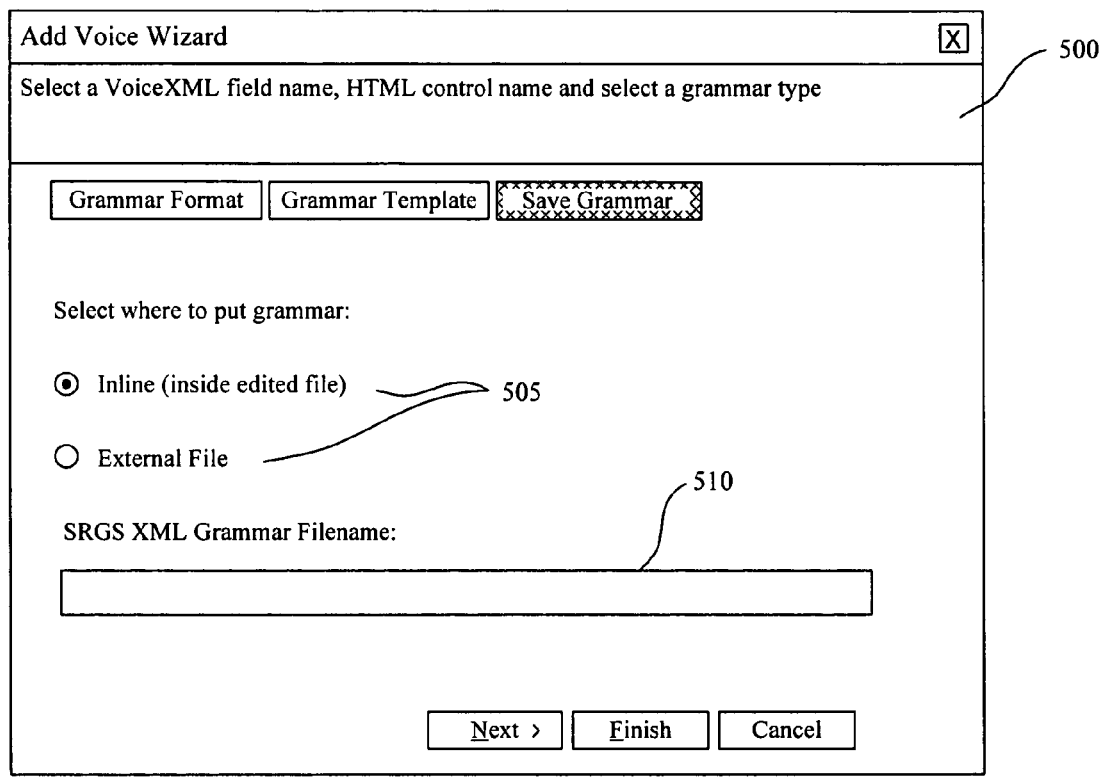
FIG. 5 is a pictorial view of yet another graphical user interface for receiving user inputs in accordance with an embodiment of the present invention.

If the user wishes to edit the voice markup code and/or the event handler code, then the user can select a "next" icon 340. In response, a text editor 400, as shown in FIG. 4, can be presented. The text editor 400 can be used to edit generated voice markup code 115 and/or event handler code. The user then can select a "Finish" icon 405 to save the voice markup code 115 and/or event handler code to a default location, or select a "Next" icon 410 to select an alternate location. For example, the user can select the "Next" icon 410 to activate a menu 500, as shown in FIG. 5, for selecting a file or document in which to save the voice markup code. The menu 500 can include, for instance, selectable radio buttons 505 for receiving a user input identifying whether to store the multimodal markup code in a location other than a default location, or to store portions of the multimodal markup code in different locations. For example, the user can choose to store the voice markup code in a file different from that in which the visual markup code is stored. A user input field 510 also can be provided to receive from the user a storage parameter identifying a storage location where to store the multimodal markup code, or portions thereof.

Figure 6:
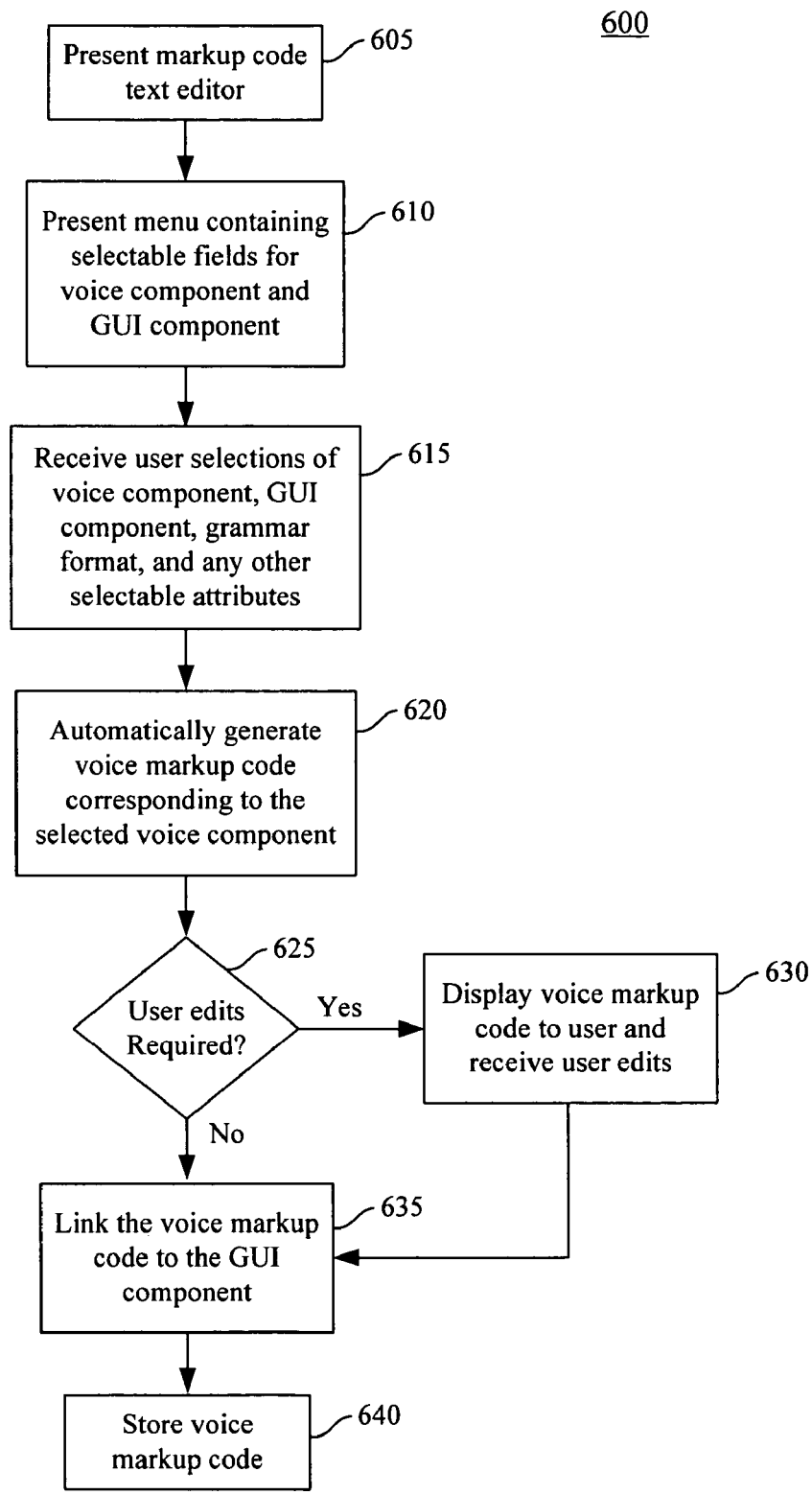
FIG. 6 is a flow chart illustrating a method to facilitate programming of multimodal access in accordance with an embodiment of the present invention.

FIG. 6 is a flow chart illustrating a method 600 to facilitate programming of multimodal access in accordance with an embodiment of the present invention. The method 600 can begin at step 605 by presenting a markup code text editor to the user. In response to a user selecting an option to voice enable a GUI component, a menu containing selectable fields for voice components and GUI components can be presented, as shown in step 610. At step 615 user selections of a GUI component to be voice enabled and of the voice component that is to be used for such purpose can be received. Selections for the grammar format and any other selectable attributes also can be received. Proceeding to step 620, voice markup code corresponding to the selected voice component can be automatically generated. Referring to decision box 625 and step 630, if the user chooses to edit the automatically generated voice markup code, such code can be displayed to the user and user edits can be received. At step 635, the voice markup code can be linked to the selected GUI component, for example by including the voice markup code with the visual markup code where the GUI component is defined, and/or by adding event handler code to the visual markup code. At step 640 the voice markup code can be stored.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software, or software application, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method to facilitate programming of multimodal access, comprising:

receiving a user input request to voice-enable at least one graphical user interface (GUI) component defined in visual markup code;

receiving a user input selecting at least one voice component specifying a voice markup field name;

receiving a user input selecting a grammar syntax from a plurality of available grammar syntaxes;

responsive to the user inputs, automatically generating voice markup code corresponding to the selected voice component comprising a field tag formatted according to the voice markup field name, a sync tag, and a grammar tag correlated to the selected grammar syntax;

automatically formatting the voice markup code according to the selected grammar syntax; and automatically linking the voice markup code to the at least one GUI component by automatically generating event handler code that links the GUI component with the voice markup code.

2. A machine readable storage, having stored thereon a computer program having a plurality of code sections executable by a machine for causing the machine to perform the steps of:

receiving a user input request to voice-enable at least one GUI (graphical user interface) component defined in visual markup code;

receiving a user input selecting at least one voice component specifying a voice markup field name;

receiving a user input selecting a grammar syntax from a plurality of available grammar syntaxes;

responsive to the user inputs, automatically generating voice markup code corresponding to the selected voice component comprising a field tag formatted according to the voice markup field name, a sync tag, and a grammar tag correlated to the selected grammar syntax;

automatically formatting the voice markup code according to the selected grammar syntax; and automatically linking the voice markup code to the visual markup code by automatically generating event handler code that links the GUI component with the voice markup code.

3. A markup editor, comprising:

a computer system comprising a processor, wherein the processor executes:

a multimodal code generating module receiving a user input request to voice-enable selection of at least one graphical user interface (GUI) component defined in visual markup code, a user input selecting selection of at least one voice component specifying a voice markup language field name, and a user input selecting a grammar syntax from a plurality of available grammar syntaxes, wherein responsive to the user inputs, the computer system automatically generates voice markup code associated with the at least one voice component, wherein the voice markup code comprises a field tag formatted according to the voice markup field name, a sync tag, and a grammar tag correlated to the selected grammar syntax, wherein the computer system automatically formats the voice markup language code according to the selected grammar syntax and automatically links the voice markup code to the GUI component by automatically generating event handler code that links the GUI component with the voice markup code.

* * * * *